US008856304B2

United States Patent
Chidambaram et al.

(10) Patent No.: US 8,856,304 B2
(45) Date of Patent: Oct. 7, 2014

(54) ACCELERATING UDP TRAFFIC (75) Inventors: Natarajan Chidambaram, Dublin, CA (US); Arivu Ramasamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 13/416,304

(22) Filed: Mar. 9, 2012

(65) Prior Publication Data

US 2013/0238811 A1 Sep. 12, 2013

(51) Int. Cl.
G06F 15/173 (2006.01)
H04L 29/06 (2006.01)
H04L 12/911 (2013.01)

(52) U.S. Cl.
CPC ........ H04L 29/06102 (2013.01); H04L 47/825 (2013.01)
USPC ............ 709/223; 709/224; 709/229; 370/392

(58) Field of Classification Search
CPC ............ H04L 29/06102; H04L 69/161; H04L 47/825
USPC ............. 709/223, 224, 229; 370/392, 395.52, 370/466
See application file for complete search history.

(56) References Cited

U.S. PATENT DOCUMENTS

| | | | | |
|---|---|---|---|---|
| 7,716,731 B2 * | 5/2010 | Short et al. | ...................... | 726/14 |
| 7,873,060 B2 * | 1/2011 | Luo et al. | ...................... | 370/401 |
| 8,018,866 B1 * | 9/2011 | Kasturi et al. | ................ | 370/252 |
| 8,094,575 B1 * | 1/2012 | Vadlakonda et al. | ......... | 370/252 |
| 8,098,688 B1 * | 1/2012 | Jaladanki et al. | ............. | 370/473 |
| 8,259,737 B2 * | 9/2012 | Moussa et al. | ................ | 370/401 |
| 8,458,344 B2 * | 6/2013 | Li et al. | ........... | 709/228 |
| 8,516,158 B1 * | 8/2013 | Wu et al. | ...................... | 709/247 |
| 2004/0111523 A1 * | 6/2004 | Hall et al. | ..................... | 709/230 |
| 2009/0092137 A1 * | 4/2009 | Haigh et al. | .................. | 370/392 |
| 2009/0319600 A1 * | 12/2009 | Sedan et al. | .................. | 709/203 |
| 2010/0098092 A1 * | 4/2010 | Luo et al. | ...................... | 370/401 |
| 2010/0128623 A1 * | 5/2010 | Dunn et al. | ................... | 370/252 |
| 2010/0265950 A1 * | 10/2010 | Foxworthy et al. | ........... | 370/392 |
| 2010/0290422 A1 * | 11/2010 | Haigh et al. | .................. | 370/329 |
| 2011/0255537 A1 * | 10/2011 | Ramasamy et al. | .......... | 370/392 |
| 2011/0295983 A1 * | 12/2011 | Medved et al. | ............... | 709/220 |
| 2012/0078994 A1 * | 3/2012 | Jackowski et al. | ........... | 709/202 |
| 2012/0173759 A1 * | 7/2012 | Agarwal et al. | ............... | 709/241 |
| 2013/0163470 A1 * | 6/2013 | Chidambaram et al. | ...... | 370/255 |
| 2013/0332573 A1 * | 12/2013 | Hegland et al. | ............... | 709/218 |

* cited by examiner

*Primary Examiner* — Lashonda Jacobs (74) *Attorney, Agent, or Firm* — Merchant & Gould (57) ABSTRACT

Systems and methods are disclosed for the acceleration of UDP traffic. tive action may be taken. Dynamic TCP tunnels may be established as the traffic flows from a source to a destination device. As the present approach is dynamic, the operational complexities are drastically reduced/eliminated. High availability systems become much easier to implement with acceleration that is dynamic and adapts to the traffic flow.

20 Claims, 7 Drawing Sheets

ACCELERATING UDP TRAFFIC

BACKGROUND

WAN optimization vendors have been able to accelerate TCP-based traffic. However, UDP-based traffic is not currently afforded the same acceleration options due to perceived complexities. There exists a need for accelerating UDP traffic with a minimum of system configuration.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Consistent with embodiments of the present disclosure, systems and methods are disclosed for the acceleration of traffic based on User Datagram Protocol ("UDP").

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Prior arts systems have proposed optimizing UDP traffic by first establishing a Generic Routing Encapsulation ("GRE") tunnel through system configuration. The GRE tunnel may run between two end points and all UDP traffic may be partially optimized on a per-packet basis and sent through the GRE tunnel. Forward Error Correction ("FEC") may be used to handle packet loss.

This manual configuration of tunnels between two end points has several disadvantages. As the number of end points in the system grows, the configuration and maintenance of the established tunnels becomes extremely laborious and complex. For solutions requiring high availability, such an approach may quickly become prohibitive due to the increased cost and complexity as an N to N ratio solution will be employed to allow high availability.

Embodiments of the present disclosure remedy many of the prior art's deficiencies through the dynamic establishment of TCP tunnels or UDP tunnels as the traffic flows from a source to a destination device. As the present approach is dynamic, the operational complexities are drastically reduced/eliminated. Furthermore, high availability systems become much easier to implement as present embodiments are dynamic and adapt to the traffic flow.

Figure 1:
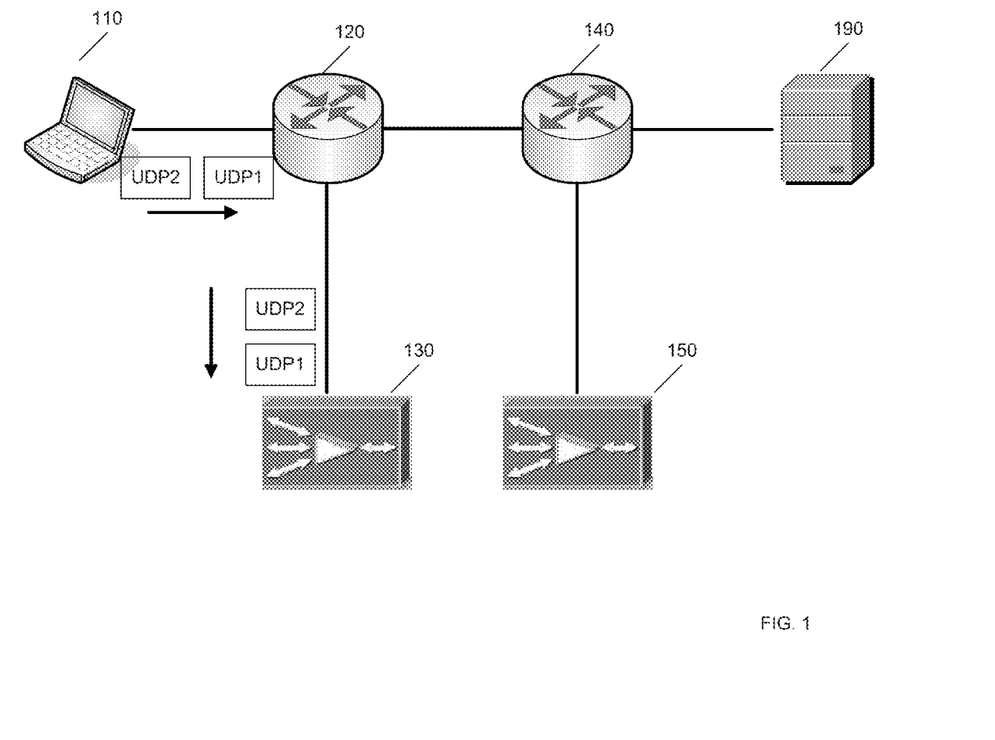
FIG. 1 is an illustration of an operating environment for embodiments described herein.

Some embodiments of the present disclosure accelerate UDP traffic through auto-discovery. FIG. 1 illustrates a sample operating environment for embodiments of UDP acceleration. A client device 110 may be communicating across a network to a server 190. On the network path, there may reside a plurality of network devices, such as router 120 and router 140.

Router 120 may be in communication with a network device, such as network device 130. In some embodiments, network device 130 may be running optimization software such as Wide Area Application Services ("WAAS"). Similarly, router 140 may be in communication with a network device, such as network device 150. Again, network device 150 may be a WAAS optimization device.

Figure 2:
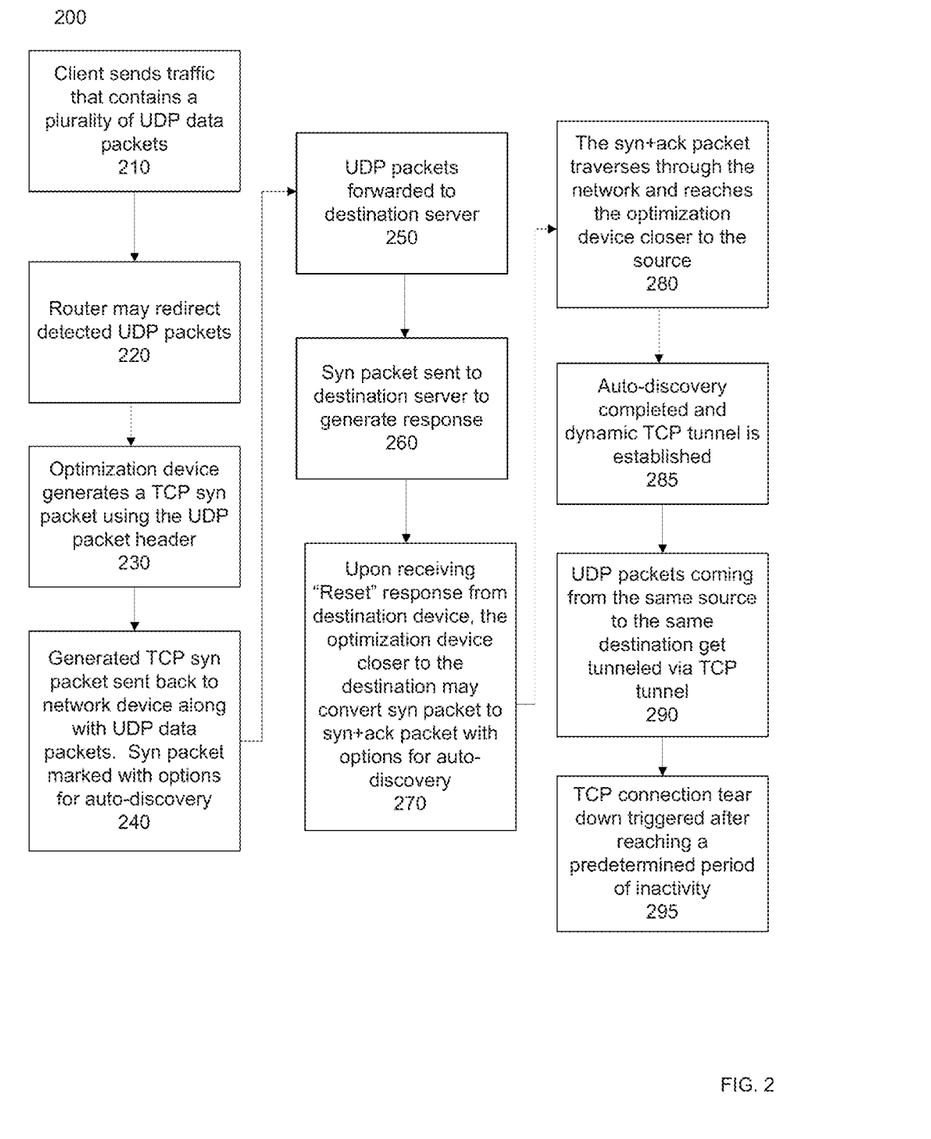
FIG. 2 is a flow chart of embodiments for accelerating UDP traffic.

FIG. 2 is a flow chart illustrating embodiments of UDP acceleration through the use of a dynamic tunnel. Method 200 may begin at step 210 where client 110 may send traffic with a destination of server 190. Client 110 may send traffic that contains a plurality of UDP data packets such as UDP data packet 160 and UDP data packet 170.

At step 220, router 120 may redirect detected UDP packets. Alternatively, in some embodiments, the UDP packets may be intercepted directly by an inline device similar to optimization device 130. When the first UDP packet arrives at optimization device 130, method 200 may proceed to step 230.

At step 230, optimization device 130 may generate a TCP syn packet using the UDP packet header. The UDP packet header may contain the IP address of the sending client 110, the destination server 190, as well as IP address information and port identification information. The generated syn packet, such as syn packet 310, illustrated in FIG. 3 may have the same source (client 110), destination (server 190) IP address, and port number as the original UDP packet. syn packet 310 may then be marked for WAAS auto-discovery. In some embodiments, various discovery options may be included in the marking. The marking may be included as an option field within the packet.

Figure 3:
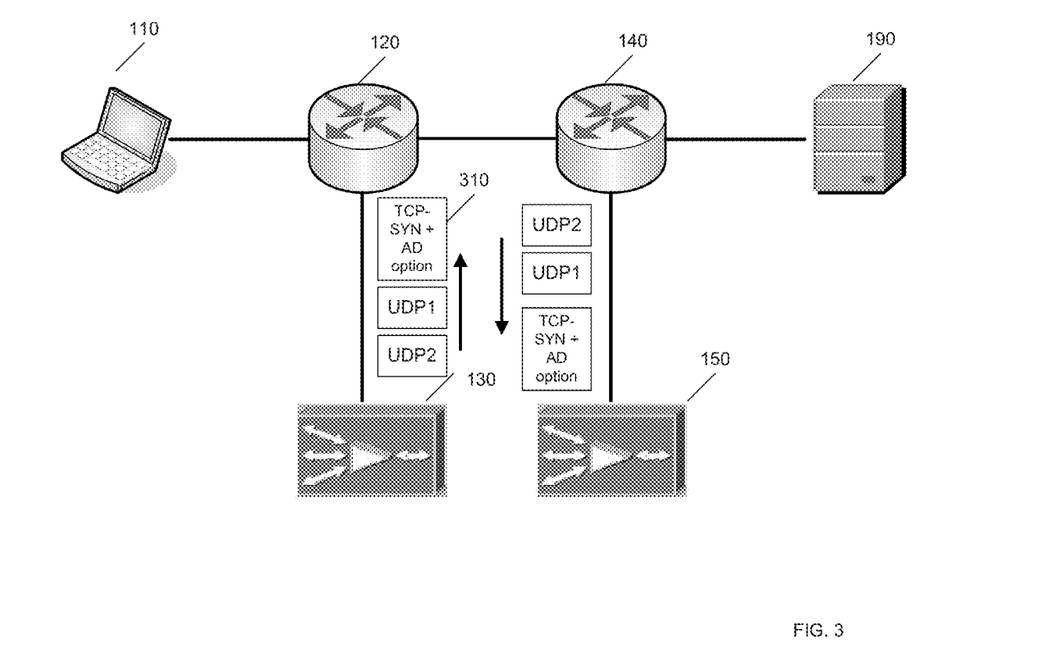
FIG. 3 is an illustration of an operating environment for embodiments described herein.

Method 200 may continue to step 240. At step 240, the generated TCP syn packet 310 may be sent back to network device 120 along with the UDP data packets such as UDP data packet 160 and UDP data packet 170. The TCP option field on syn packet 310 may be used for auto-discovery and also to indicate to the remote optimization devices (e.g., WAAS optimization device 150) that the packet 310 is a "generated" packet.

Next, at step 250, the UDP packets may be sent across the network towards destination server 190 from network device 120 to network device 140. Subsequently, at step 260 SYN packet 310 may be sent from the destination server 190 to generate a response.

If at step 260, destination server 190 may send a RST, such as RST 320, method 200 may proceed to step 270 where the optimization device closest to destination server 190 (in this case, optimization device 150) may drop the RST and generate a SYN-ACK packet by converting the SYN packet 310 into a SYN-ACK packet. In some embodiments, discovery options may be added to the SYN-ACK packet before forwarding it along.

If at step 260, destination server 190 sends a SYN-ACK, the remote optimization devices may add options to the packet. This approach is similar to TCP auto-discovery.

The SYN-ACK (whether generated by an optimization device or sent from destination server 190) may be dropped by the optimization device that originally sent syn packet 310. The options on the SYN-ACK may indicate which remote optimization device is closest to the destination server 190. The optimization device that originally created syn packet 310 may then create a TCP state for the connection. This TCP state may contain the original client and server IP addresses, which further increases the transparency of embodiments in this disclosure.

In some embodiments, the options added to the SYN-ACK may contain the IP addresses of the optimization devices. With this information a TCP tunnel or UDP tunnel may be established between the optimization devices and transparency may be lost. At step 280, the SYN-ACK packet may traverse through the network and reach the optimization device closer to the source.

Figure 4:
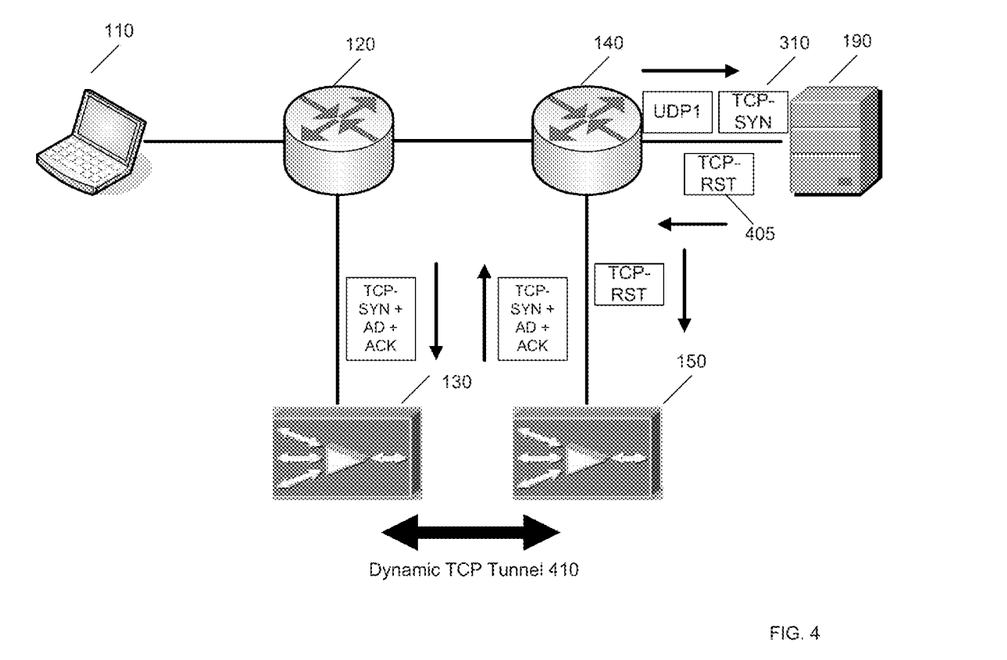
FIG. 4 is an illustration of an operating environment for embodiments described herein.

At step 285, auto-discovery has completed, and a TCP connection (or tunnel), such as tunnel 410 illustrated in FIG. 4 has been established, method 200 may proceed to step 290. At step 290, any UDP packets, such as UDP data packets 160 and 170, travelling from client 110 to server 190 will be tunneled through the TCP connection. As such, any potential packet loss over the network (WAN) may be handled with TCP protocols.

In some embodiments, if there is no optimization device on the other side, syn packet 310 may then be sent to destination server 190. Destination server 190 will subsequently sent a RST packet, such as RST packet 405. The optimization device will subsequently drop the RST and stop auto-discovery. The optimization device will also subsequently stop attempting to optimize the connection for a certain duration. If UDP traffic persists, auto-discovery may be attempted after a time-out.

In some embodiments, destination server 190 may send a SYN-ACK packet with no other optimization device in the path, the originating optimization device will receive the SYN-ACK with no options. The optimization device may then generate a RST sent to destination server 190. This auto discovery may occur within the UDP data flow, so there is no data loss as the original UDP packets continue to flow between client 110 and server 190.

Method 200 may finally proceed to step 295. At step 295, the TCP connection (tunnel) may be torn down. It should be noted that if the optimization device chooses to establish a UDP tunnel there may be no need to perform a tear down. In some embodiments, the tear down may be triggered after reaching a predetermined period of inactivity.

Figure 5:
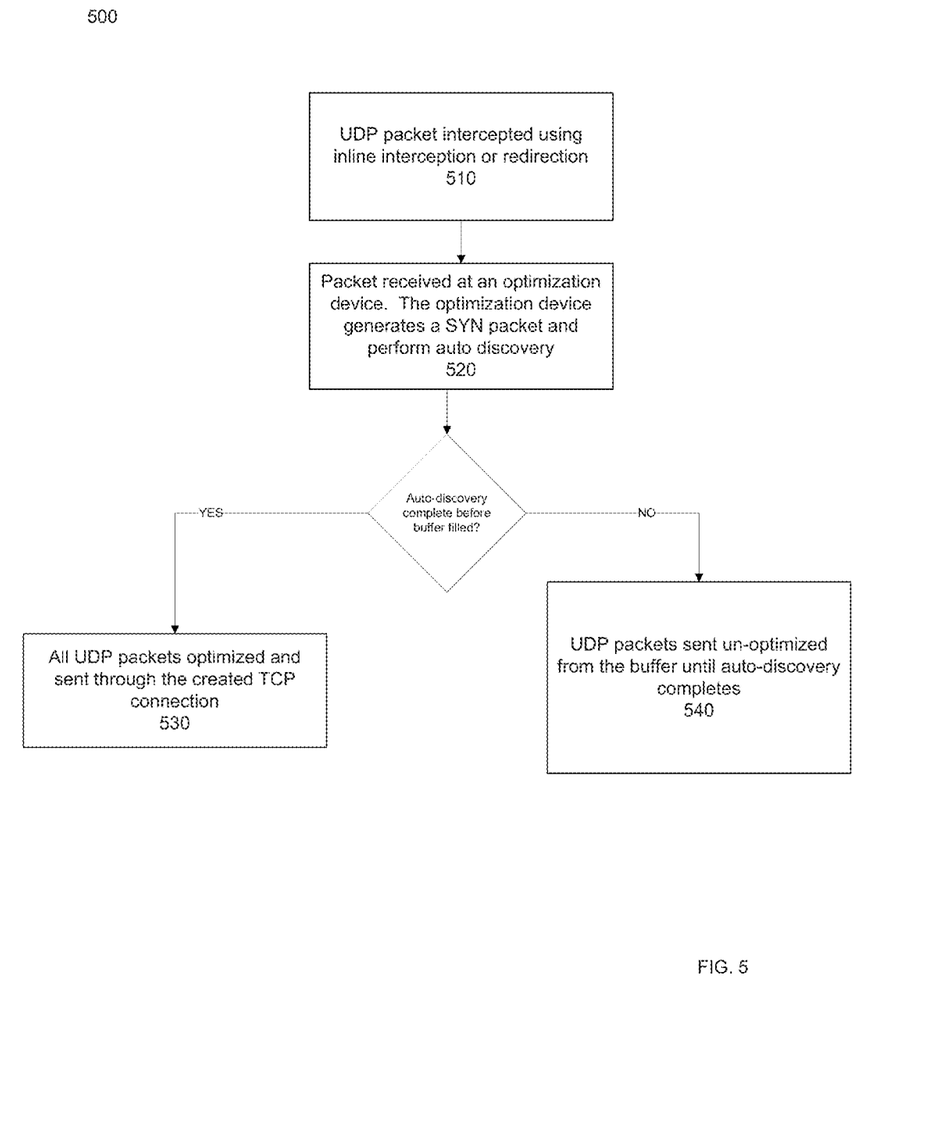
FIG. 5 is a flow chart of embodiments for accelerating UDP traffic.

FIG. 5 is a flow chart illustrating some embodiments of UDP acceleration. Method 500 may begin at step 510 where a packet may be intercepted using inline interception or redirection using known redirection methods such as PBR and WCCP. Method 500 may then proceed to step 520 where a first packet may be received at an optimization device. The optimization device may generate a SYN packet and perform auto discovery as discussed with regards to FIG. 2.

During auto discovery, the following UDP packets may be buffered until such time that the buffer reaches capacity. If the auto-discovery is completed prior to the buffer reaching capacity, then method 500 proceeds to step 530. At step 530, all of the UDP packets may be optimized and sent through the created TCP connection.

If the auto discovery did not complete before the buffer reaches capacity, method 500 may proceed to step 540. At step 540, UDP packets may be sent unoptimized from the buffer until auto-discovery completes.

Figure 6:
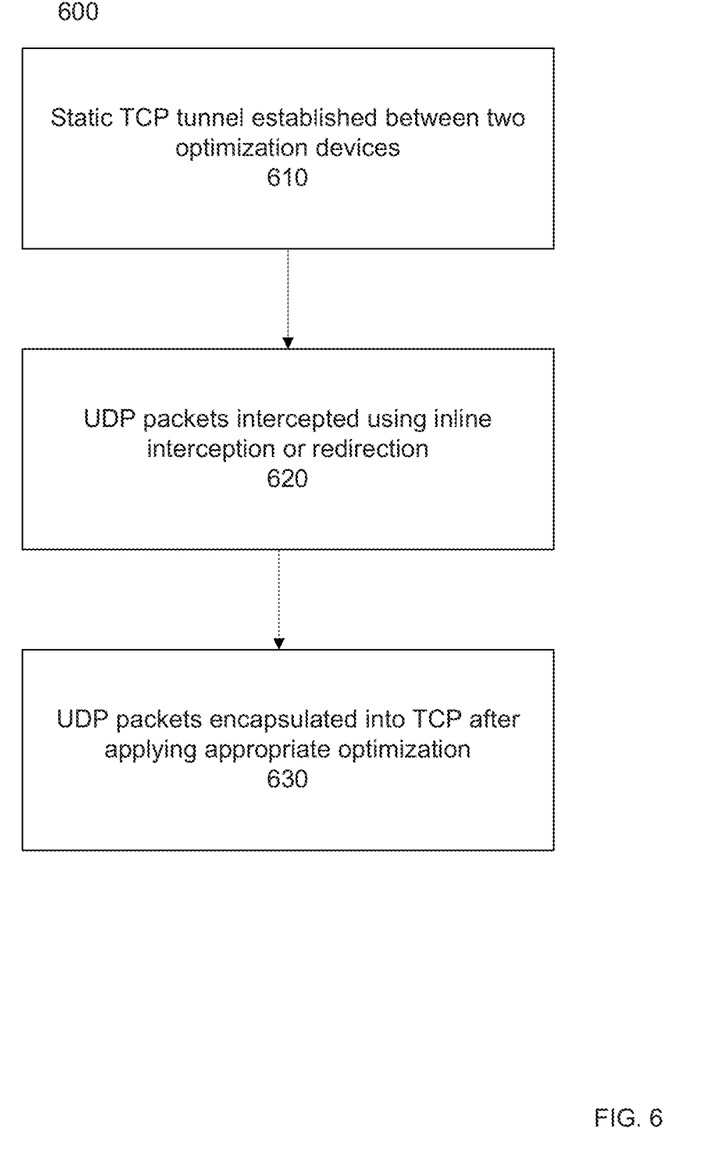
FIG. 6 is a flow chart of embodiments for accelerating UDP traffic.

FIG. 6 is a flow chart illustrating some embodiments of UDP acceleration using a static tunnel. Method 600 may begin at step 610 where a static TCP tunnel may be established between two optimization devices. Next, at step 620, UDP packets may be intercepted using inline interception or redirection using known redirection methods such as PBR and WCCP.

Method 600 may then proceed to step 630 where since the TCP tunnel is established between two optimization devices, the UDP packets may be encapsulated into TCP after applying appropriate optimization.

Figure 7:
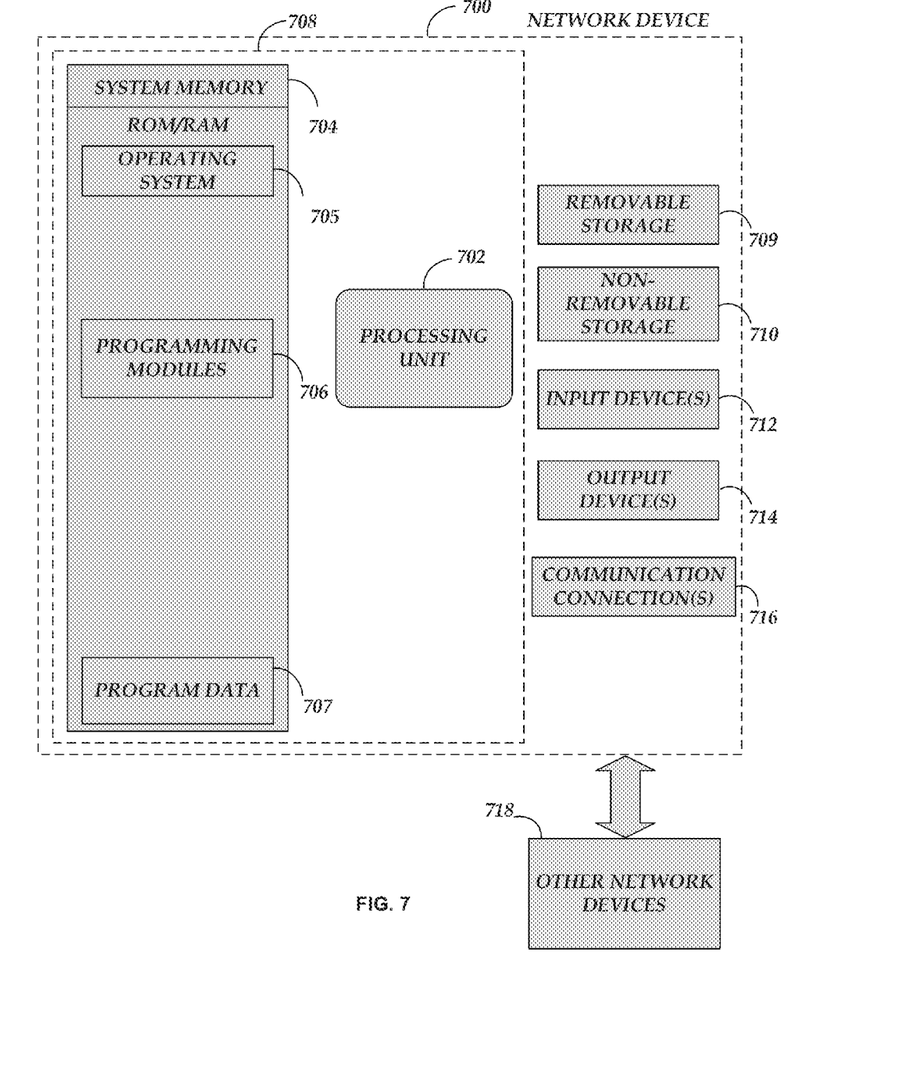
FIG. 7 is a block diagram of a network computing device.

FIG. 7 is a block diagram of a system including network device 700. Consistent with embodiments of the present disclosure, the aforementioned memory storage and processing unit may be implemented in a network device, such as network device 700 of FIG. 7. Any suitable combination of hardware, software, or firmware may be used to implement the memory storage and processing unit. For example, the memory storage and processing unit may be implemented with network device 700 or any of other network devices 718, in combination with network device 700. The aforementioned system, device, and processors are examples and other systems, devices, and processors may comprise the aforementioned memory storage and processing unit, consistent with embodiments of the present disclosure.

With reference to FIG. 7, a system consistent with embodiments of the present disclosure may include a network device, such as network device 700. In a basic configuration, network device 700 may include at least one processing unit 702, a secure processing unit for decryption 720, and a system memory 704. Depending on the configuration and type of network device, system memory 704 may comprise, but is not limited to, volatile (e.g., random access memory (RAM)), non-volatile (e.g., read-only memory (ROM)), flash memory, or any combination. System memory 704 may include operating system 705, one or more programming modules 706, and may include program data 707. Operating system 705, for example, may be suitable for controlling network device 700's operation. Furthermore, embodiments of the present disclosure may be practiced in conjunction with a graphics library, other operating systems, or any other application program and is not limited to any particular application or system. This basic configuration is illustrated in FIG. 7 by those components within a dashed line 708.

Network device 700 may have additional features or functionality. For example, network device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 700. Any such computer storage media may be part of device 700. Network device 700 may also have input device (s) 712 such as a keyboard, a mouse, a pen, a sound input device, a touch input device, etc. Output device(s) 714 such as a display, speakers, a printer, etc. may also be included. The aforementioned devices are examples and others may be used.

Network device 700 may also contain a communication connection 716 that may allow device 700 to communicate with other network devices 718, such as over a network in a distributed network environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702 or secure processing unit for decryption 720, programming modules 706 may perform processes including, for example, one or more method 200, 500 and 600's stages as described above. The aforementioned process is an example; processing unit 702 and secure processing unit for decryption 720 may perform other processes.

Generally, consistent with per-subscriber stream management according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the present disclosure may also be practiced in distributed network environments where tasks are performed by remote processing devices that are linked through a communications network. In a distributed network environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present disclosure, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of per-subscriber stream management. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present disclosure have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the present disclosure.

What is claimed is:

1. A method comprising:
   receiving a plurality of UDP packets at a first optimization device;
   determining whether a second optimization device is associated with a destination device, wherein the determination is based on receipt of a RST packet from the destination device;
   ceasing attempts to enter an optimization mode if it is determined that no second optimization device is associated with the destination device;
   establishing a dynamic tunnel between the first optimization device and the second optimization device, if it is determined that the second optimization device is associated with the destination device;
   tunneling the plurality of UDP packets from the first optimization device and the second optimization device; and
   forwarding the plurality of tunneled UDP packets to a destination device.

2. The method of claim 1, further comprising intercepting the plurality of UDP packets with an inline device.

3. The method of claim 1, further comprising redirecting the plurality of UDP packets from a routing device to the first optimization device.

4. The method of claim 1, wherein the step of establishing a dynamic tunnel further comprises: generating a TCP SYN packet of the first received of the plurality of UDP packets; and forwarding the generated TCP SYN packet to the destination device.

5. The method of claim 4, further comprising marking the TCP SYN packet with one or more discovery options.

6. The method of claim 5, further comprising receiving a SYN-ACK packet in response from the destination device.

7. The method of claim 5, further comprising: receiving a RST packet in response from the destination device; dropping the RST packet; generating a SYN-ACK packet; and forwarding the SYN-ACK packet.

8. The method of claim 5, wherein the options indicate a closest optimization device to the destination device and an optimization device that generated the TCP SYN packet.

9. The method of claim 8, further comprising establishing one of a: TCP state and a UDP state for a connection between the indicated closest optimization device to the destination device and the optimization device that generated the TCP SYN packet.

10. The method of claim 1, further comprising tearing down a dynamic TCP tunnel after a predetermined period of inactivity.

11. A network device comprising:
    a first memory;
    a buffer memory; and
    a processor, wherein the processor is configured to:
    receive a first intercepted UDP packet; generate a TCP SYN packet based on the first intercepted UDP packet;
    perform auto-discovery; while auto-discovery is being performed, storing a plurality of subsequently received UDP packets in the buffer memory;
    and
    sending optimized UDP packets after completion of auto-discovery, wherein sending is based on a determination whether an optimization device is associated with a destination device, wherein the determination is based on receipt of a RST packet from the destination device.

12. The network device of claim 11, wherein the processor is further configured to: monitor the available capacity of the buffer memory.

13. The network device of claim 12, wherein the processor is further configured to: send unoptimized UDP packets in the buffer memory to their destination; and accept additional UDP packets in the buffer memory until auto-discovery completes.

14. The network device of claim 11, wherein the processor is further configured to: mark a generated TCP SYN packet with one or more discovery options.

15. The network device of claim 14, wherein the one or more discovery options indicate to remote optimization devices that the associated packet is a generated packet.

16. A method comprising:
    establishing a static TCP tunnel between a first optimization device and a second optimization device if it is determined that a second optimization device is associated with the destination device;
    receiving a plurality of UDP data packets at one of the first optimization device and the second optimization device;
    determining whether the second optimization device is associated with a destination device, wherein the determination is based on receipt of a RST packet from the destination device;
    ceasing attempts to enter an optimization mode if it is determined that no second optimization device is associated with the destination device;
    performing optimization of the plurality of UDP data packets at one of the first optimization device and the second optimization device; and
    encapsulating the plurality of UDP data packet into TCP at one of the first optimization device and the second optimization device.

17. The method of claim 16, wherein the plurality of UDP data packets are received through inline interception.

18. The method of claim 16, wherein the plurality of UDP data packets are received through redirection from a remote network device.

19. The method of claim 18, wherein the redirection employs one of: WCCP or PBR protocols.

20. The method of claim 16, wherein the plurality of UDP data packets share the same client and destination information.

* * * * *